US010516644B2

United States Patent
Shi et al.

(10) Patent No.: US 10,516,644 B2
(45) Date of Patent: Dec. 24, 2019

(54) NEAR REAL TIME RELEVANCE RANKER FOR NOTIFICATIONS

(71) Applicant: Microsoft Technology Licensing, LLC, Redmond, WA (US)

(72) Inventors: Changji Shi, Palo Alto, CA (US); Zhongen Tao, Sunnyvale, CA (US); Jinyun Yan, Sunnyvale, CA (US); Yan Gao, Sunnyvale, CA (US); Shaunak Chatterjee, Sunnyvale, CA (US); Sandor Nyako, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 100 days.

(21) Appl. No.: 15/966,567

(22) Filed: Apr. 30, 2018

(65) Prior Publication Data

US 2019/0334851 A1   Oct. 31, 2019

(51) Int. Cl.
| | |
|---|---|
| *G06F 15/16* | (2006.01) |
| *H04L 12/58* | (2006.01) |
| *H04L 29/08* | (2006.01) |
| *G06N 20/00* | (2019.01) |
| *G06F 16/9535* | (2019.01) |
| *G06F 16/2457* | (2019.01) |
| *G06Q 50/00* | (2012.01) |

(52) U.S. Cl.
CPC ........ *H04L 51/32* (2013.01); *G06F 16/24578* (2019.01); *G06F 16/9535* (2019.01); *G06N 20/00* (2019.01); *H04L 67/306* (2013.01); *G06Q 50/01* (2013.01)

(58) Field of Classification Search
CPC ....... H04L 51/32; H04L 67/306; G06N 20/00; G06F 16/9535; G06F 16/24578; G06Q 50/01
USPC ......................... 709/201, 206, 207, 225, 231
See application file for complete search history.

(56) References Cited

U.S. PATENT DOCUMENTS

| | | | | |
|---|---|---|---|---|
| 2004/0230598 | A1* | 11/2004 | Robertson | G06F 16/337 |
| 2017/0187722 | A1* | 6/2017 | Roundtree | H04W 4/06 |
| 2018/0121966 | A1* | 5/2018 | Schmidt | G06Q 30/0273 |
| 2018/0307749 | A1* | 10/2018 | Al Hasan | G16H 15/00 |

* cited by examiner

*Primary Examiner* — Liang Che A Wang
(74) *Attorney, Agent, or Firm* — Schwegman Lundberg & Woessner, P.A.

(57) ABSTRACT

A notification platform for distribution of notification content in an on-line social network system addresses the technical problem of optimizing the volume of quality notifications that are being delivered to a given member. A notification delivery system is designed as a stream processing system that can fetch, store, and process data in a near-line fashion. It can perform feature generation, processing and scoring of notifications, as well as ranking of the notifications based on their respective relevance scores that are calculated using machine learning techniques. The notification delivery system is positioned centrally with respect to different producers of notifications, such that it can consume centrally-stored information about members' holistic notification experiences.

14 Claims, 4 Drawing Sheets

NEAR REAL TIME RELEVANCE RANKER FOR NOTIFICATIONS

TECHNICAL FIELD

This application relates to the technical fields of software and/or hardware technology and, in one example embodiment, to system and method for near real time relevance ranking of notifications in an on-line social network system.

BACKGROUND

An on-line social network may be viewed as a platform to connect people in virtual space, where registered members establish and document networks of people. Each registered member of an on-line social network may be represented by a member profile, which, in turn, may be represented by one or more web pages, a structured representation of the member's information in XML (Extensible Markup Language), JSON (JavaScript Object Notation) or similar format. A member's profile web page of a social networking web site may emphasize employment history and education of the associated member. An on-line social network system also may be configured to facilitate communication among members by, e.g., providing updates relevant to members in the form of notifications.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

Figure 1:
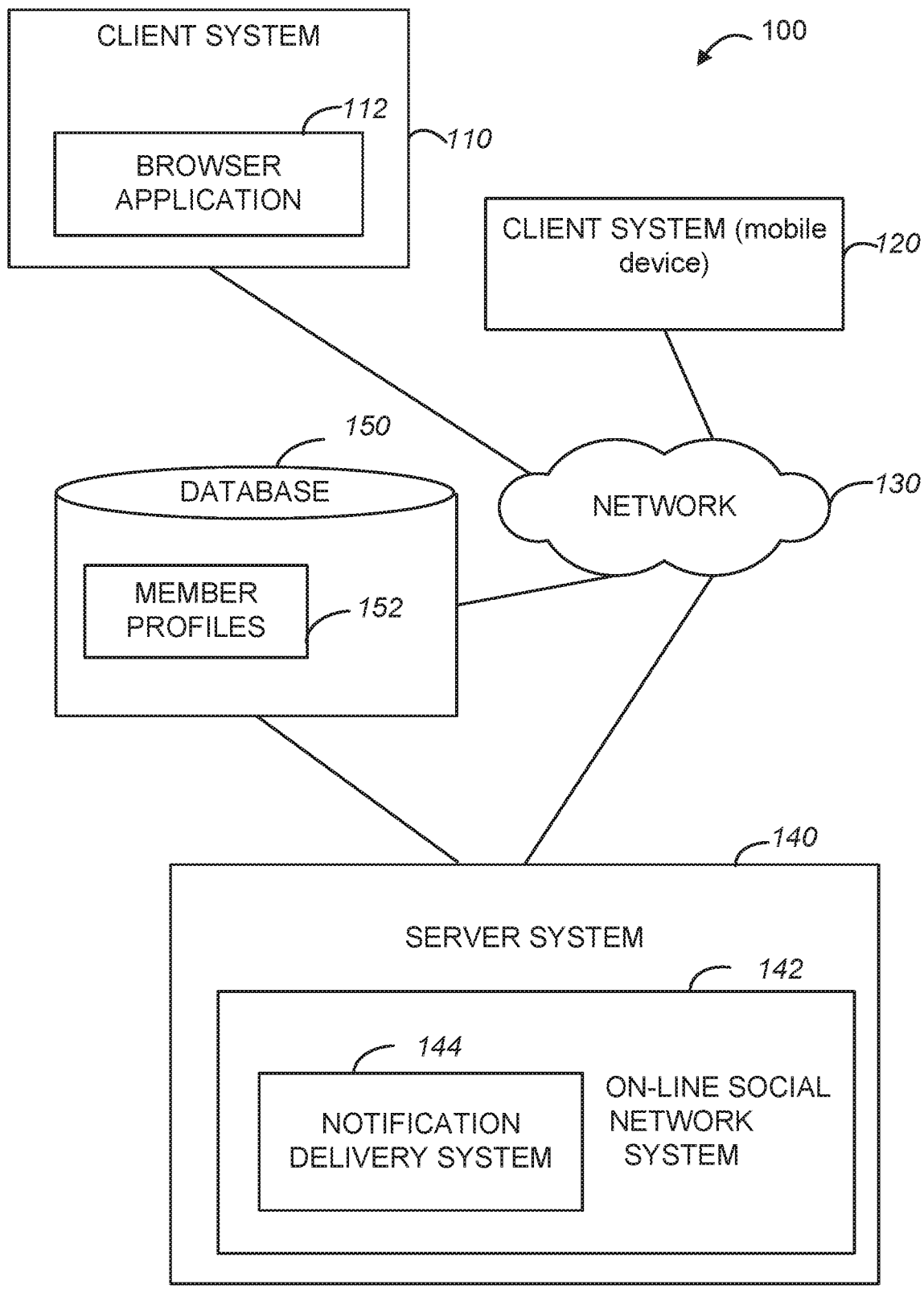
FIG. 1 is a diagrammatic representation of a network environment within which an example method and system for near real time relevance ranking of notifications in an on-line social network system may be implemented.

A method and system for near real time relevance ranking of notifications in an on-line social network system in an on-line social network is described. In the following description, for purposes of explanation, numerous specific details are set forth in order to provide a thorough understanding of an embodiment of the present invention. It will be evident, however, to one skilled in the art that the present invention may be practiced without these specific details.

As used herein, the term "or" may be construed in either an inclusive or exclusive sense. Similarly, the term "exemplary" is merely to mean an example of something or an exemplar and not necessarily a preferred or ideal means of accomplishing a goal. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method described herein and is considered as being within a scope of the present invention.

For the purposes of this description the phrase "an on-line social networking application" may be referred to as and used interchangeably with the phrase "an on-line social network" or merely "a social network." It will also be noted that an on-line social network may be any type of an on-line social network, such as, e.g., a professional network, an interest-based network, or any on-line networking system that permits users to join as registered members. For the purposes of this description, registered members of an on-line social network may be referred to as simply members. Each member of an on-line social network is represented by a member profile (also referred to as a profile of a member or simply a profile). A member profile may be associated with social links that indicate the member's connection to other members of the social network. A member profile may also include or be associated with comments or recommendations from other members of the on-line social network, with links to other network resources, such as, e.g., publications, etc. As mentioned above, an on-line social networking system may be designed to allow registered members to establish and document networks of people they know and trust professionally. Any two members of a social network may indicate their mutual willingness to be "connected" in the context of the social network, in that they can view each other's profiles, provide recommendations and endorsements for each other and otherwise be in touch via the social network.

The profile information of a social network member may include personal information such as, e.g., the name of the member, current and previous geographic location of the member, current and previous employment information of the member, information related to education of the member, information about professional accomplishments of the member, publications, patents, etc. The profile information of a social network member may also include information about the member's professional skills, such as, e.g., "product management," "patent prosecution," "image processing," etc.). The profile of a member may also include information about the member's current and past employment, such as company identifications, professional titles held by the associated member at the respective companies, as well as the member's dates of employment at those companies. The on-line social network system is configured to facilitate interactions among members by permitting members to share content, such as, e.g., publications related to science and technology or any other topic by posting an update that would appear on respective news feed pages of the other members. An update may be an original message, a link to an on-line publication, a re-share of a post by another member, etc. Members that are presented with such an update on their news feed page may choose to indicate that they like the post, may be permitted to contribute a comment, etc. The on-line social network also may provide members with a search capability, where members may access job postings, company pages, other member profiles, etc. by entering a search term into the search box and examining the returned search results.

The on-line social network system also includes a notifications distribution platform that distributes an input content stream in the form of notifications. Notifications are information items intended to alert a member to content that they may find to be of interest. A notification may be with respect to a user action that makes changes to their member profile, such as, e.g., change of employment, a new connection, etc. A notification may also be with respect to an action initiated by a member, such as, e.g., sharing, liking, or commenting on a publication in the on-line social network system, making a change to their profile, connecting with another member, etc. Other examples of notifications are a notification about a member's birthday, a notification about a news article that a member posted, etc. A member profile that triggered a notification generation—e.g., a profile representing a member who shared or interacted with content or a profile from which notification content was derived—is referred for the purposes of this description as a triggering profile. A member profile representing a member that has been identified as being potentially interested in receiving a given notification is referred for the purposes of this description as a candidate profile.

The notifications system, compared to news feed or search system in an on-line social network, is a push model, meaning that the recipient of a notification has no control about the content as to whether to receive it and how to receive it. Different types of notifications are generated by different producers (different programmatic modules) in the on-line social network system. For example, one producer may be configured to generate notifications that alert members to social actions of their connections. Another producer may be configured to generate notifications regarding changes to member profiles. Different producers have their respective relevance components that are often built as offline pipelines that cannot fetch and process real time features from online services and do not have information about other types of notifications. Real time features with respect to a member profile are indicative of the number and frequency of notifications that already have been sent to the associated member and, also, of the member's engagement level with the received notifications.

Some existing systems rely on a centralized rule-based filtering of notifications obtained from different producers to address user's preferences with respect to receiving notifications and to prevent over-sending of the notifications. A notification distribution filter that is solely rule-based may prove to be less than optimal because of the way rules are chosen and, also, because there is no feedback loop to detect that a rule may have become obsolete or useless and to remove or modify it. Furthermore, a centralized rule-based filtering system does not allow to make personalized decision for each member according to their immediate needs or behaviors.

The technical problem of optimizing the volume of high quality notifications that are being delivered to a given member is addressed by the methodologies described herein that leverage machine learning. Specifically, a notification delivery system is designed as a stream processing system that can fetch, store, and process data in a near-line fashion. It can perform feature generation, processing and scoring of notifications, and ranking the notifications based on their respective relevance scores. In deriving a value representing relevance of a notification with respect to a given member profile, the notification delivery system uses real-time features that align with the associated members' current interest and takes into consideration member's actions with respect to other notifications generated for that member profile. In addition, the notification delivery system is positioned centrally with respect to different producers of notifications, such that it can consume centrally-stored information about members' holistic notification experiences.

In operation, the notification delivery system accesses a notification from a stream of notifications and commences the process of determining whether and how the notification is to be sent to a member represented by a subject member profile in the on-line social network system. The stream of notifications includes notifications that have been generated by different producers. The notification may be associated with a relevance score generated by a first pass ranker (FPR) provided with the producer that generated the notification. This relevance score generated by the FPR is indicative of the quality of the notification—the relevance of the notification content to the subject member profile. The notification delivery system extracts real-time features associated with the subject member profile from an in-disk database that is local with respect to the notification delivery system itself. The real time features include values indicating whether the member is receiving other notifications, whether the member is acting on the received notification and in which way, whether the member changed the activity level with respect to the received notifications, etc. For example, a real time feature may be a value indicating how many and/or what types of notifications have been delivered to the member subject profile during a certain period of time. Another real time feature may be a value indicating the latest batch count of delivered and unviewed notifications. Real time features may also include engagement signals, e.g., positive engagement signals, such as viewing the notification or following a link provided in the notification, and negative engagement signals, such as deleting the notification prior to viewing, unsubscribing a certain type of notification, or changing settings to stop receiving any notifications. In some embodiments, these features are obtained by monitoring activities originated from the subject member profile with respect to notifications. The notification delivery system is configured to transform raw data obtained with respect to a member profile into real-time features that can be consumed by the second pass ranker (SPR).

The extracted real time features with respect to the subject profile, together with the relevance value generated by the FPR, are used as input into the second pass ranker (SPR), which is a machine learning model designed to generate a relevance score that is used to determine whether the notification should be delivered to the subject member profile and, if so, what channel is to be used for the delivery of the notification. It will be noted, that while the relevance value generated by the FPR is used to ensure the quality of the notification, the score generated by the SPR is used to control the volume and frequency of the notification delivered to the subject member profile, based on the real time features and, in most cases, regardless of the type of the notification. Different channels that can be used for delivery of the notification include email, in-app delivery, and red dot delivery. In-app notification channel permits delivery of a notification while a user had the associated mobile application open on their mobile device. Red dot type of delivery means increasing the count of delivered but unread notifications, the count displayed as associated (next to or overlapping) the icon representing the associated mobile application on the screen of the user's mobile device. The delivery channel, as mentioned above, may be selected based on the relevance score generated by the SPR.

In one embodiment, in order to determine whether the relevance score generated by the SPR for the notification warrants delivery of the notification to the subject member profile, the notification delivery system extracts a personalized threshold that is calculated particularly for the subject member profile. Conventionally, a predefined and uniform threshold is used to determine whether a notification is to be sent to a member profile. The embodiment where the same threshold is used for all member profiles has a drawback in the sense that the send/no-send decision favors the active members because the relevance score generated for notifications with respect to more active members tend to be higher than the relevance score generated for notifications with respect to less active members. As a result, the less active members may starve from receiving notifications due to the low relevance score of their prospective notifications. The purpose of a personalized threshold is to mitigate this impact and balance the notification volume across different member segments. The notion of a personalized threshold is devised to help those less active members to receive at least some notifications with relatively good quality, while still delivering the high quality notifications to active members. Respective personalized thresholds are generated for each particular member profile based on the associated member's activities in the on-line social network system. More active member profiles will have higher personalized threshold than dormant member profiles, the goal being to improve the overall notification coverage. In some embodiments, personalized thresholds are generated using a machine learning model that can be trained using data that reflects the associated member's behavior with respect to notifications.

As stated above, the notification delivery system extracts the personalized threshold that is calculated particularly for the subject member profile and compares it to the relevance score generated by the SPR. The decision of whether the notification is to be delivered to the subject member profile is made based on the result of the comparison. In some embodiments, the notification delivery system uses two or more personalized thresholds, each of which determines a different delivery channel. Multiple personalized thresholds for the subject profile are pre-calculated (e.g., be based on the observed click-through-rate (CTR) for the subject profile with respect to overall or a particular notification type) and stored in an in-memory database that is local with respect to the notification delivery system itself.

The notification delivery system is also configured to train the machine learning model, the SPR, using the real time features generated for member profile. A given set of real time features used as input into the SPR is also used to create a features snapshot that, together with not-real-time features of the associated member profile is used as training data. Example platform for distributing notifications in an on-line social network system may be implemented in the context of a network environment 100 illustrated in FIG. 1.

As shown in FIG. 1, the network environment 100 may include client systems 110 and 120 and a server system 140. The client system 120 may be a mobile device, such as, e.g., a mobile phone or a tablet. The server system 140, in one example embodiment, may host an on-line social network system 142. As explained above, each member of an on-line social network is represented by a member profile that contains personal and professional information about the member and that may be associated with social links that indicate the member's connection to other member profiles in the on-line social network. Member profiles and related information may be stored in a database 150 as member profiles 152.

The client systems 110 and 120 may be capable of accessing the server system 140 via a communications network 130, utilizing, e.g., a browser application 112 executing on the client system 110, or a mobile application executing on the client system 120. The communications network 130 may be a public network (e.g., the Internet, a mobile communication network, or any other network capable of communicating digital data). As shown in FIG. 1, the server system 140 also hosts a notification delivery system 144 for distribution of notifications using the methodologies described above. An example notification delivery system 144 is illustrated in FIG. 2.

Figure 2:
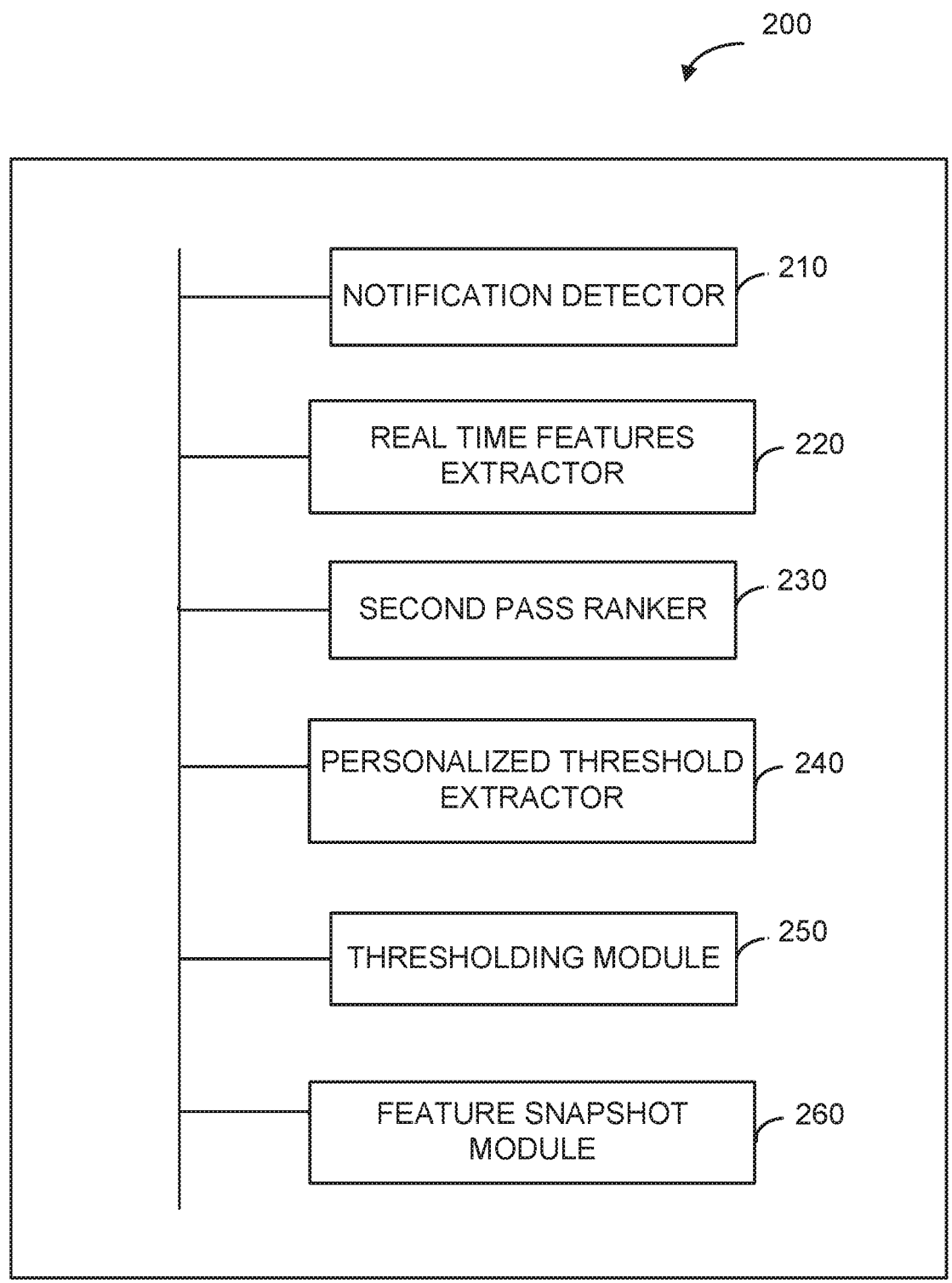
FIG. 2 is block diagram of a system for near real time relevance ranking of notifications in an on-line social network system, in accordance with one example embodiment.

FIG. 2 is a block diagram of a system 200 for distribution of notifications in an on-line social network system, in accordance with one example embodiment. The system 200, in some embodiments, corresponds to the notification delivery system 144. As shown in FIG. 2, the system 200 includes a notification detector 210, a real time features extractor 220, a second pass ranker 230, a personalized threshold extractor 240, a thresholding module 250, and a feature snapshot module 260.

The notification detector 210 is configured to detect a notification in a stream of notifications. The real time features extractor 220 is configured to extract real time features with respect to a subject profile. As explained above, real time features with respect to a member profile are values that are indicative of the number and frequency of notifications that already have been sent to the associated member and, also, of the member's engagement level with the received notifications. These features are obtained by monitoring activities that originate from the subject member profile with respect to notifications and storing the results of the monitoring in an in-memory database that is local with respect to the notification delivery system itself. The second pass ranker 230 is configured to executing a machine learning model using the extracted real time features as input in order to calculate a relevance score with respect to the notification and the subject member profile. The personalized threshold extractor 240 is configured to access a personalized threshold calculated for the subject member profile based on previously obtained signals with respect to engagement of the subject member profile with previously delivered notifications. The thresholding module 250 is configured to determine whether the notification is to be delivered to a member represented by the subject profile based on a result of comparing of the relevance score with the personalized threshold. The thresholding module 250 may be configured to use two or more personalized thresholds, each of which determines a different delivery channel, as described above. The feature snapshot module 260 is configured to generate and store a feature snapshot of the extracted real time features, such that the resulting snapshot can be used as training data for training the machine learning model. Some operations performed by the system 200 may be described with reference to FIG. 3.

Figure 3:
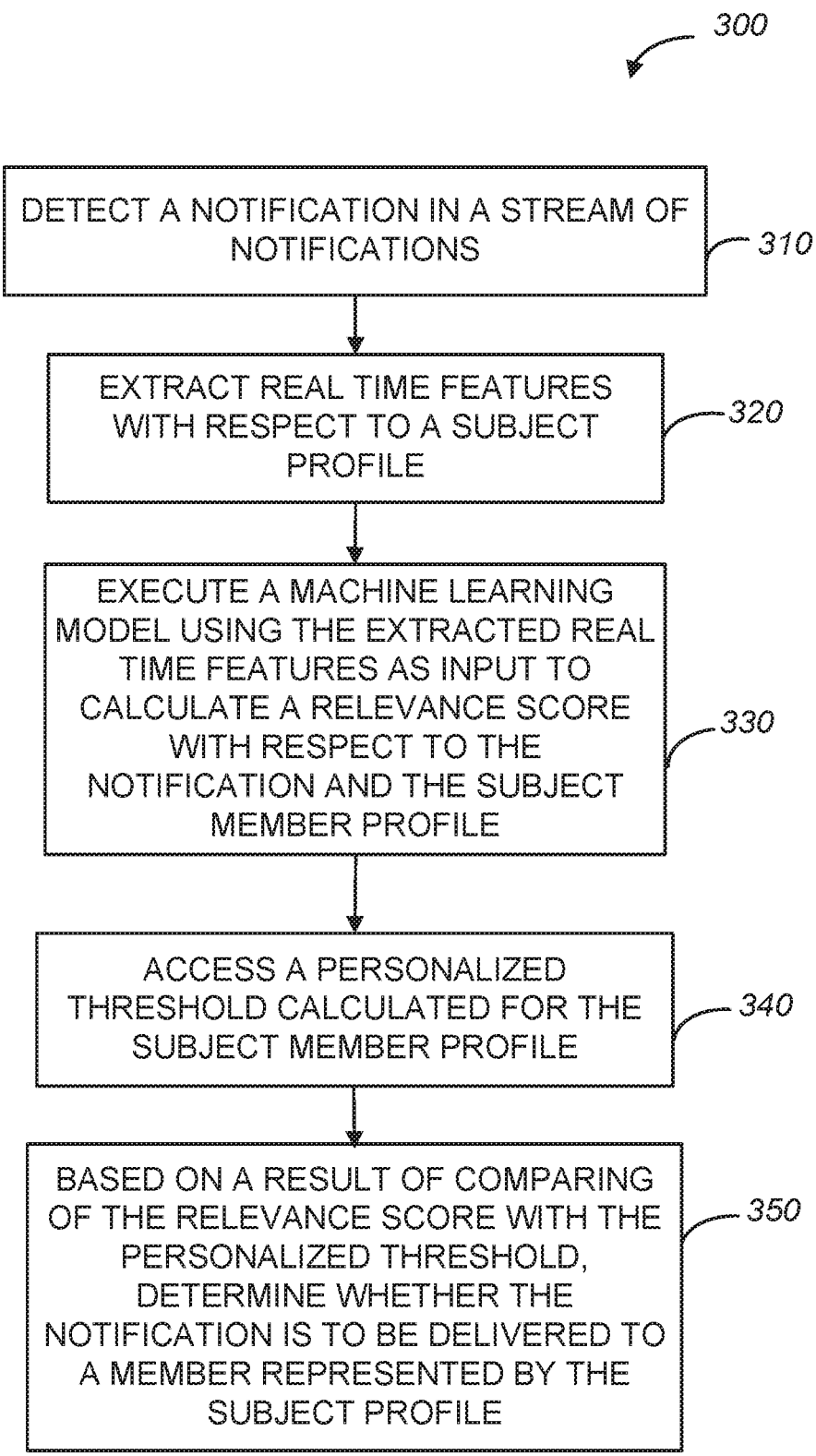
FIG. 3 is a flow chart of a method for near real time relevance ranking of notifications in an on-line social network system, in accordance with an example embodiment.

FIG. 3 is a flow chart of a method 300 for near real time relevance ranking of notifications in an on-line social network system, according to one example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

As shown in FIG. 3, the method 300 commences at operation 310, when the notification detector 210 of FIG. 2 detects a notification in a stream of notifications. At operation 320, the real time features extractor 220 of FIG. 2 extracts real time features with respect to a subject profile. The second pass ranker 230 of FIG. 2 executes a machine learning model using the extracted real time features as input in order to calculate a relevance score with respect to the notification and the subject member profile, at operation 330. At operation 340, the personalized threshold extractor 240 of FIG. 2 accesses a personalized threshold calculated for the subject member profile based on previously obtained signals with respect to engagement of the subject member profile with previously delivered notifications. The thresholding module 250 of FIG. 2 determines whether the notification is to be delivered to a member represented by the subject profile based on a result of comparing of the relevance score with the personalized threshold, at operation 350.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Figure 4:
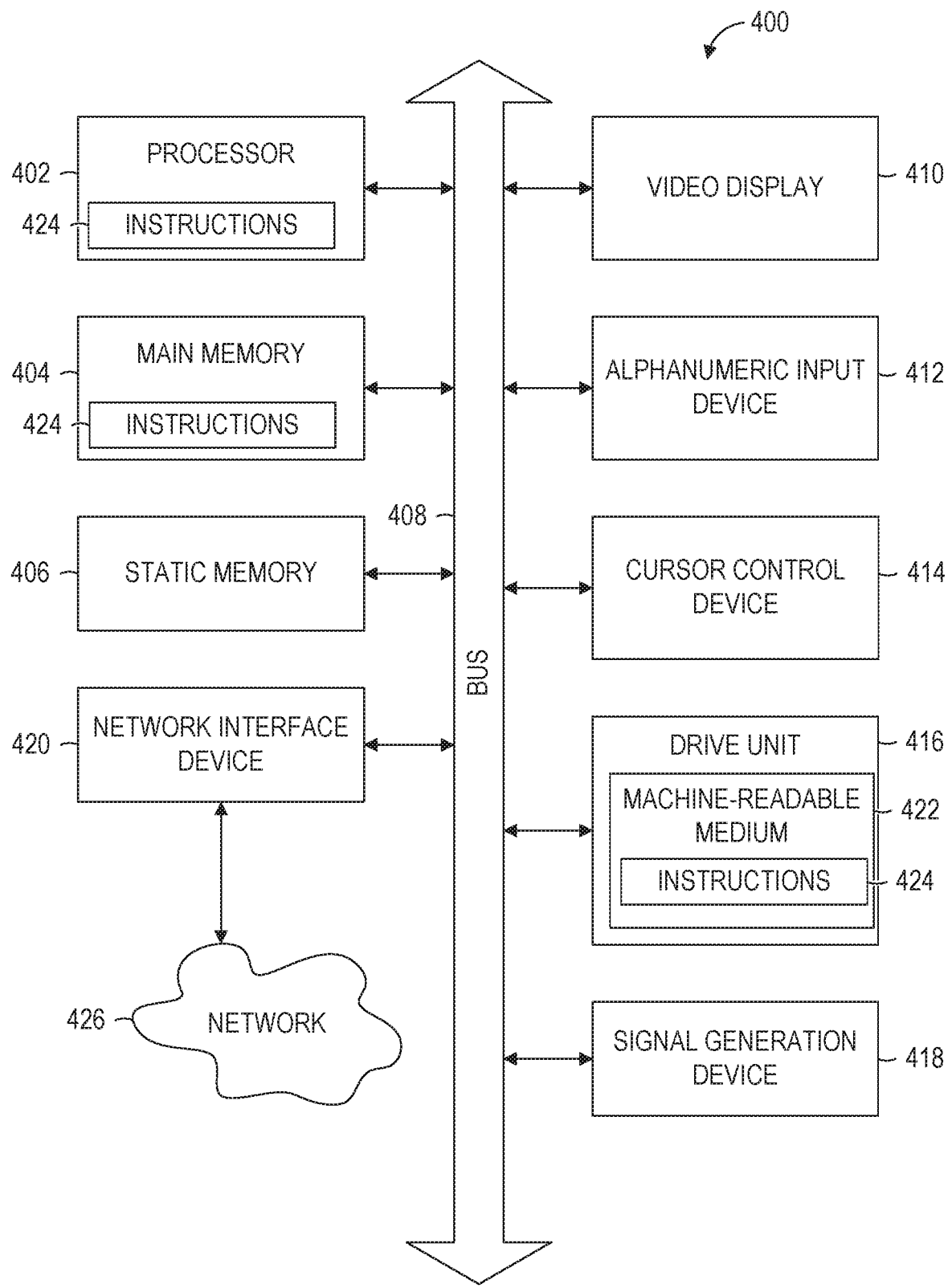
FIG. 4 is a diagrammatic representation of an example machine in the form of a computer system within which a set of instructions, for causing the machine to perform any one or more of the methodologies discussed herein, may be executed.

FIG. 4 is a diagrammatic representation of a machine in the example form of a computer system 400 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 404. The computer system 400 may further include a video display unit 410 (e.g., a liquid crystal display (LCD) or a cathode ray tube (CRT)). The computer system 400 also includes an alpha-numeric input device 412 (e.g., a keyboard), a user interface (UI) navigation device 414 (e.g., a cursor control device), a disk drive unit 416, a signal generation device 418 (e.g., a speaker) and a network interface device 420.

The disk drive unit 416 includes a machine-readable medium 422 on which is stored one or more sets of instructions and data structures software 424) embodying or utilized by any one or more of the methodologies or functions described herein. The software 424 may also reside, completely or at least partially, within the main memory 404 and/or within the processor 402 during execution thereof by the computer system 400, with the main memory 404 and the processor 402 also constituting machine-readable media.

The software 424 may further be transmitted or received over a network 426 via the network interface device 420 utilizing any one of a number of well-known transfer protocols (e.g., Hyper Text Transfer Protocol (HTTP)).

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules, A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location e.g., within a home environment, an office environment or as a server farm), while in other embodiments the processors may be distributed across a number of locations.

The one or more processors may also operate to support performance of the relevant operations in a "cloud computing" environment or as a "software as a eservice" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, method and system for near real time relevance ranking of notifications in an on-line social network system have been described. Although embodiments have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense.

The invention claimed is:

1. A computer-implemented method comprising:
   in an on-line social network system that maintains member profiles representing members of the on-line social network system, detecting a notification in a stream of notifications, the notification is generated by a producer from a plurality of producers, each producer from the plurality of producers utilizing different first pass rankers to calculate respective preliminary relevance scores for notifications;
   on-line and in response to the detecting of the notification, using at least one processor:
      extracting real time features with respect to a subject profile,
      executing a machine learning model using the extracted real time features as input to calculate a relevance score with respect to the notification and the subject member profile, the machine learning model trained using a previously stored feature snapshot of previously extracted real time features with respect to the subject profile,
      accessing a personalized threshold calculated for the subject member profile based on previously obtained signals with respect to engagement of the subject member profile with previously delivered notifications, and
      based on a result of comparing of the relevance score with the personalized threshold, determining that the notification is to be delivered to a member represented by the subject profile.

2. The method of claim 1, further comprising:
   based on the relevance score and the personalized threshold, determine a communication channel to be used for delivery of the notification; and
   deliver the notification to a member represented by the subject member profile using the determined communication channel.

3. The method of claim 1, wherein the notification is associated with a preliminary relevance score generated by a first pass ranker provided with a producer of the notification, the preliminary relevance score is used as further input to the machine learning model to calculate the relevance score with respect to the notification and the subject member profile.

4. The method of claim 1, further comprising calculating the personalized threshold for the subject member profile based on previously obtained signals with respect to engagement of the subject member profile with previously delivered notifications and storing the personalized threshold in a database that is local with respect to the machine learning model.

5. The method of claim 1, wherein the calculating of the personalized threshold comprises assigning a greater value to the personalized threshold based on features indicating greater engagement of the subject member profile with previously delivered notifications and assigning a lesser value to the personalized threshold based on features indicating lesser engagement of the subject member profile with the previously delivered notifications.

6. The method of claim 1, wherein the real time features reflect events triggered by the subject member profile with respect to notifications delivered to the subject member profile during a specified time period.

7. The method of claim 1, wherein a feature from the real time features indicates a number of notifications delivered to the subject member profile during a specified time period.

8. A system comprising:
one or more processors; and
a non-transitory computer readable storage medium comprising instructions that when executed by the one or processors cause the one or more processors to perform operations comprising:
in an on-line social network system that maintains member profiles representing members of the on-line social network system, detecting a notification in a stream of notifications, the notification is generated by a producer from a plurality of producers, each producer from the plurality of producers utilizing different first pass rankers to calculate respective preliminary relevance scores for notifications;
on-line and in response to detecting of the notification, using at least one processor:
extracting real time features with respect to a subject profile,
executing a machine learning model using the extracted real time features as input to calculate a relevance score with respect to the notification and the subject member profile, the machine learning model trained using a previously stored feature snapshot of previously extracted real time features with respect to the subject profile,
accessing a personalized threshold calculated for the subject member profile based on previously obtained signals with respect to engagement of the subject member profile with previously delivered notifications, and
based on a result of comparing of the relevance score with the personalized threshold, determining that the notification is to be delivered to a member represented by the subject profile.

9. The system of claim 8, further comprising:
based on the relevance score and the personalized threshold, determine a communication channel to be used for delivery of the notification; and
deliver the notification to a member represented by the subject member profile using the determined communication channel.

10. The system of claim 8, wherein the notification is associated with a preliminary relevance score generated by a first pass ranker provided with a producer of the notification, the preliminary relevance score is used as further input to the machine learning model to calculate the relevance score with respect to the notification and the subject member profile.

11. The system of claim 8, further comprising calculating the personalized threshold for the subject member profile based on previously obtained signals with respect to engagement of the subject member profile with previously delivered notifications and storing the personalized threshold in a database that is local with respect to the machine learning model.

12. The system of claim 8, wherein the calculating of the personalized threshold comprises assigning a greater value to the personalized threshold based on features indicating greater engagement of the subject member profile with previously delivered notifications and assigning a lesser value to the personalized threshold based on features indicating lesser engagement of the subject member profile with the previously delivered notifications.

13. The system of claim 8, wherein the real time features reflect events triggered by the subject member profile with respect to notifications delivered to the subject member profile during a specified time period.

14. A machine-readable non-transitory storage medium having instruction data executable by a machine to cause the machine to perform operations comprising:
in an on-line social network system that maintains member profiles representing members of the on-line social network system, detecting a notification in a stream of notifications, the notification is generated by a producer from a plurality of producers, each producer from the plurality of producers utilizing different first pass rankers to calculate respective preliminary relevance scores for notifications;
on-line and in response to the detecting of the notification, using at least one processor:
extracting real time features with respect to a subject profile,
executing a machine learning model using the extracted real time features as input to calculate a relevance score with respect to the notification and the subject member profile, the machine learning model trained using a previously stored feature snapshot of previously extracted real time features with respect to the subject profile,
accessing a personalized threshold calculated for the subject member profile based on previously obtained signals with respect to engagement of the subject member profile with previously delivered notifications, and
based on a result of comparing of the relevance score with the personalized threshold, determining that the notification is to be delivered to a member represented by the subject profile.

* * * * *

UNITED STATES PATENT AND TRADEMARK OFFICE
CERTIFICATE OF CORRECTION

PATENT NO. : 10,516,644 B2  
APPLICATION NO. : 15/966567  
DATED : December 24, 2019  
INVENTOR(S) : Shi et al.

Page 1 of 1

It is certified that error appears in the above-identified patent and that said Letters Patent is hereby corrected as shown below:

In the Claims

In Column 11, Line 25, in Claim 8, before "processors", insert --more--

In Column 11, Line 35, in Claim 8, after "to", insert --the--

Signed and Sealed this  
Fifth Day of May, 2020

Andrei Iancu  
*Director of the United States Patent and Trademark Office*